(12) United States Patent
Hikichi et al.

(10) Patent No.: US 12,196,977 B2
(45) Date of Patent: Jan. 14, 2025

(54) DISPLAY DEVICE

(71) Applicant: ALPS ALPINE CO., LTD., Tokyo (JP)

(72) Inventors: Kazuya Hikichi, Fukushima (JP); Katsunari Ashimine, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 273 days.

(21) Appl. No.: 17/742,713

(22) Filed: May 12, 2022

(65) Prior Publication Data

US 2022/0382066 A1    Dec. 1, 2022

(30) Foreign Application Priority Data

May 25, 2021  (JP) ................. 2021-087518

(51) Int. Cl.
| | | |
|---|---|---|
| *G02B 27/10* | (2006.01) | |
| *G02B 27/00* | (2006.01) | |
| *G02B 27/14* | (2006.01) | |
| *H04N 9/31* | (2006.01) | |

(52) U.S. Cl.
CPC ....... *G02B 27/106* (2013.01); *G02B 27/0093* (2013.01); *G02B 27/14* (2013.01); *H04N 9/3152* (2013.01)

(58) Field of Classification Search
CPC .. G02B 27/106; G02B 27/0093; G02B 27/14; H04N 9/3152
USPC ....................................................... 359/630
See application file for complete search history.

(56) References Cited

U.S. PATENT DOCUMENTS

| | | |
|---|---|---|
| 2013/0100416 A1 | 4/2013 | Shimatani et al. |
| 2018/0284470 A1 | 10/2018 | Yamamoto et al. |
| 2019/0285904 A1 | 9/2019 | Kim et al. |

FOREIGN PATENT DOCUMENTS

| | | | |
|---|---|---|---|
| JP | 2013-190448 A | | 9/2013 |
| JP | 2017-107165 A | | 6/2017 |
| JP | 2018031925 A | * | 3/2018 |
| JP | 2018-081138 A | | 5/2018 |
| JP | 2019-066833 A | | 4/2019 |
| JP | 2019-101055 A | | 6/2019 |

OTHER PUBLICATIONS

JP 2018031925 A (Year: 2018).*
Extended European Search Report for European Patent Application No. 22173839.6 dated Oct. 31, 2022, 8 pages.
Notification of Reasons for Refusal and English translation for JP 2021-087518, Aug. 6, 2024.

* cited by examiner

*Primary Examiner* — William Choi
(74) *Attorney, Agent, or Firm* — Crowell & Moring LLP

(57) ABSTRACT

A display device includes a display capable of displaying an image, a beam-splitter that reflects light from the display, a retro-reflective member that reflects the light from the beam-splitter in the same direction as incident light, a first variable unit that varies an inclination angle of the display, and a second variable unit that varies an inclination angle of the beam-splitter, and prevents the image of the display from entering an aerial image.

16 Claims, 8 Drawing Sheets

FIG. 1

PRIOR ART

FIG. 2

| ΔBS | ΔDisplay | ΔAerial |
|---|---|---|
| 0° | 0° | 0° |
| 0° | 10° | 10° |
| 0° | 20° | 20° |
| 5° | 20° | 30° |
| 10° | 20° | 40° |
| 15° | 20° | 50° |
| 15° | 30° | 60° |

- AVERAGE SITTING HEIGHT

| [ADULT] | [ELEMENTARY SCHOOL STUDENT] |
|---|---|
| MALE: 92cm | Ave: 71cm |
| FEMALE: 86cm | |
| Ave: 89cm | |

- EYE POINT

| (cm) | MAX | AVE() | MIN |
|---|---|---|---|
| SITTING HEIGHT | 100 | 89 | 71 |
| EYE POINT | 90 | 79 | 61 |

| ΔBS | ΔDisplay | ΔAerial | |
|---|---|---|---|
| 0° | 0° | 0° | ⎫ |
| 0° | 10° | 10° | ⎬ CHAIR RECLINED |
| 0° | 20° | 20° | ⎭ |
| 5° | 20° | 30° | ⎫ |
| 10° | 20° | 40° | ⎬ CHAIR UPRIGHT |
| 15° | 20° | 50° | |
| 15° | 30° | 60° | ⎭ |

DISPLAY DEVICE

BACKGROUND

Related Application

The present application claims priority to Japanese Patent Application Number 2021-087518, filed on May 25, 2021, the entirety of which is hereby incorporated by reference.

Field

The present disclosure relates to a display device that displays an image in the air using retro-reflection.

Description of the Related Art

Aerial imaging using retro-reflection (AIRR) is known (for example, JP 2017-107165 A, JP 2018-81138 A, JP 2019-66833 A, and JP 2019-101055 A). Further, J P 2013-190448 A discloses a display device capable of moving a beam-splitter and a display, and satisfactorily observing a planar image of an aerial image projected therefrom.

SUMMARY

In a case where an AIRR display device is of a desk-type, a movable aerial image (or aerial picture) is important as a function thereof. By moving the aerial image, it can be expected that a viewing angle at which a user can observe the aerial image is widened, and related physical limitations of the user are greatly improved. The display device of JP 2013-190448 A controls the aerial image by moving the beam-splitter and the display, but there are no measures against a display main body entering a field of view during observation of the aerial image.

Figure 1:
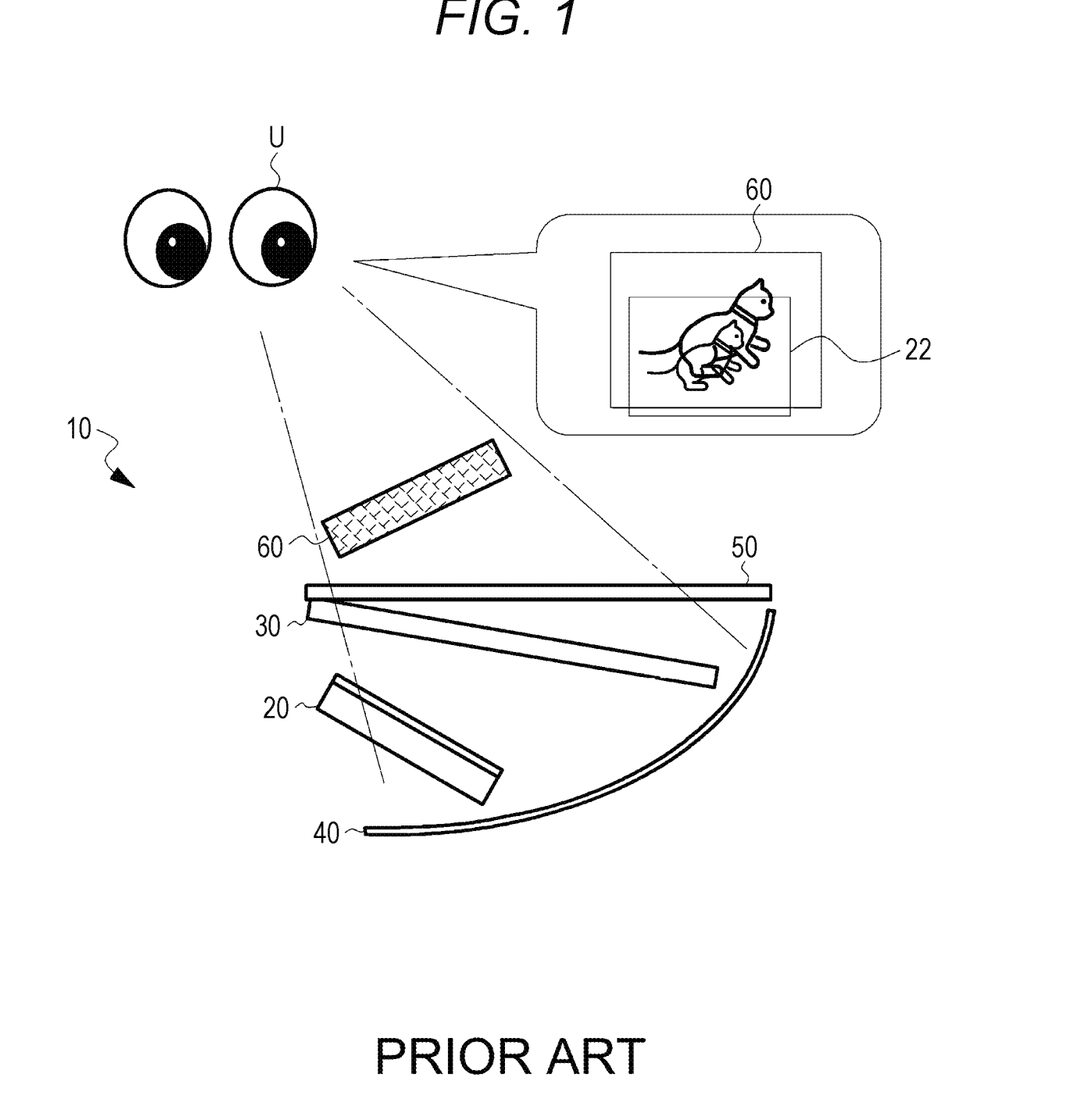
FIG. 1 is a schematic cross-sectional view illustrating a configuration of a conventional display device.

When the aerial image and the display overlap, a picture of the display enters the aerial image, and a floating feeling of the picture, which is a characteristic of the aerial image, is impaired. FIG. 1 is a schematic cross-sectional view illustrating a configuration of a conventional desk-type display device. A display device 10 includes a display (light source) 20 having a screen capable of displaying an image, a beam-splitter 30, a retro-reflective member 40, and a table 50 made of transparent glass or the like installed in a housing.

A part of light emitted from the display 20 is reflected by the beam-splitter 30; reflected light of the light is incident on the concave retro-reflective member 40; incident light of the reflected light is reflected by the retro-reflective member 40 in the same direction as the incident light; and, a part of reflected light of the incident light is transmitted through the beam-splitter 30 and the table 50 and reimaged, so that the aerial image 60 is displayed. The aerial image 60 is generated at a position symmetrical to the display 20 with respect to the surface of the beam-splitter 30. The aerial image 60 that can be observed by a user is limited to a range in which the retro-reflective member 40 can be viewed from a viewpoint U of the user via the beam-splitter 30.

As illustrated in the drawing, when the display 20 enters the field of view from a viewpoint U of the user, the user observes the aerial image 60 and an image 22 of the display 20 in an overlapping manner, and the floating feeling of the aerial image 60 is impaired.

An object of the present disclosure is to solve such a conventional problem and to provide a display device having a function of preventing an image of a display from entering an aerial image.

A display device according to the present disclosure is capable of displaying an aerial image using retro-reflection, and includes a display capable of displaying an image. A beam-splitter is configured to reflect light emitted from the display; a retro-reflective member is configured to reflect the light from the beam-splitter in a same direction as incident light; a first variable unit is configured to vary an inclination angle of the display; and, a second variable unit configured to vary an inclination angle of the beam-splitter.

In one mode, the first variable unit and the second variable unit satisfy $\Delta\theta = 180 - (\Delta\text{Aerial} + \Delta\text{Display}) \geq 90$ degrees, where the inclination angle of the display is denoted by $\Delta\text{Display}$, an inclination angle of the aerial image generated at a position symmetric to the display with respect to the beam-splitter is denoted by $\Delta\text{Aerial}$, and an angle formed by the aerial image and the display is denoted by $\Delta\theta$. In one mode, the first variable unit and the second variable unit satisfy $\Delta\text{Aerial} = \Delta\text{BS} \times 2 + \Delta\text{Display}$, where the inclination angle of the beam-splitter is denoted by $\Delta\text{BS}$. In one mode, the first variable unit includes a mechanism that interlocks with the second variable unit. In one mode, the display device further includes a control unit configured to control the first variable unit and the second variable unit such that the image of the display does not enter a field of view of a user when the aerial image is observed from a vertical direction. In one mode, the control unit calculates a viewpoint of the user, estimates an optimum angle when observing the aerial image on a basis of the calculated viewpoint, and controls the first variable unit and the second variable unit on a basis of the estimated optimum angle.

According to the present disclosure, since the beam-splitter and the display are movable, a movable range of the aerial image can be expanded, whereby the aerial image having a floating feeling can be observed from eye points of various users. In particular, by moving the beam-splitter having high angle dependence of the aerial image, it is possible to expand the movable range of the aerial image while suppressing movement of the display.

DETAILED DESCRIPTION

A display device of the present disclosure displays an aerial image or an aerial picture using retro-reflection in a three-dimensional space, without wearing special glasses or the like. The drawings to be referred to in the description of the following embodiments include exaggerated displays in order to facilitate understanding of the disclosure, and do not directly represent the shape and scale of an actual display device.

Figure 2:
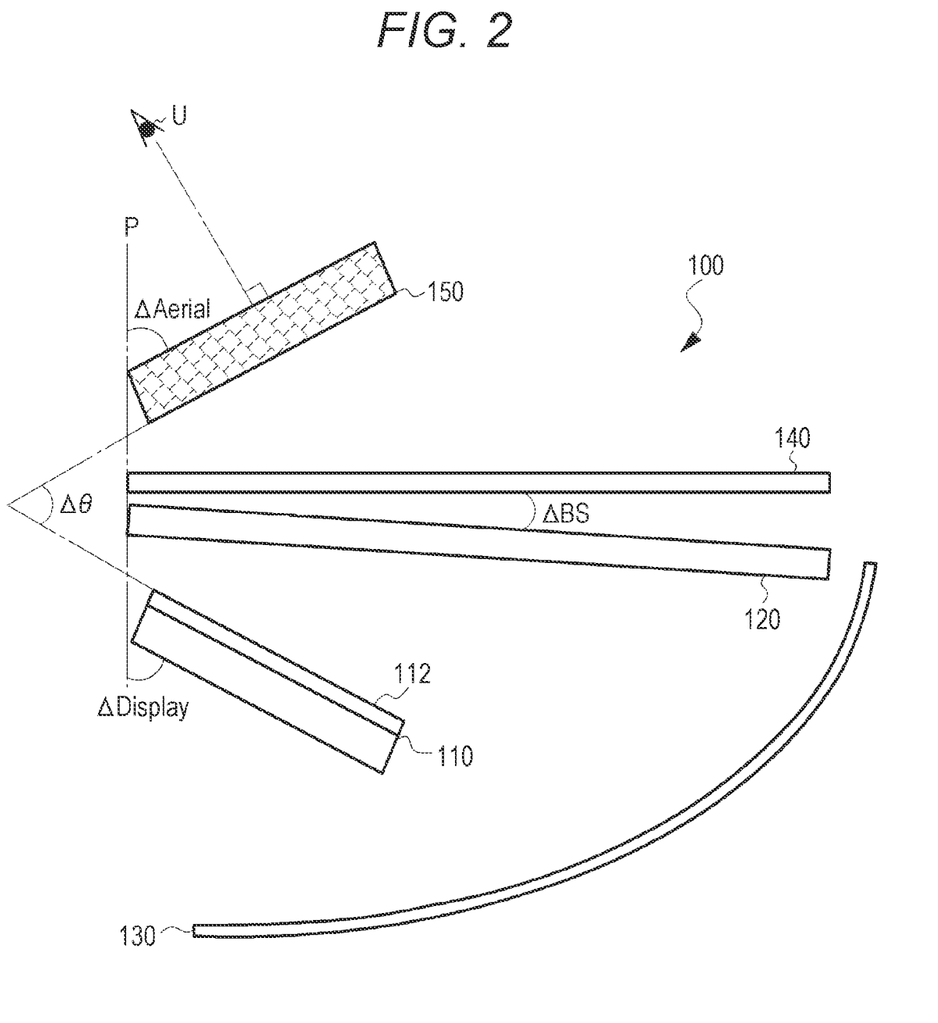
FIG. 2 is a schematic cross-sectional view of a display device according to an embodiment of the present disclosure.

Next, an embodiment of the present disclosure will be described in detail below. FIG. 2 is a schematic cross-sectional view illustrating a configuration of the display device according to an embodiment of the present disclosure. A display device 100 of the present embodiment includes a display 110 as a light source, a beam-splitter 120, a retro-reflective member 130, and a table 140 disposed on the top of a housing (casing) constituting a desk. The display device 100 of the present embodiment can move the beam-splitter 120 and the display 110, thereby changing a position or an angle at which an aerial image 150 is displayed.

The display 110 includes a screen 112 for displaying an image or a picture, and emits light from the screen 112 at a constant emission angle or radiation angle. The display 110 is not particularly limited, and for example, a liquid crystal display, an organic EL display, a projection projector, a light emitting diode, a laser diode, or the like can be used.

The display 110 is rotatable about an end of the display as a fulcrum such that an inclination angle of the screen 112 changes with respect to a reference plane P of the housing. The reference plane P is, for example, a vertical plane. A mechanism for changing the inclination angle of the display 110 is not particularly limited, but for example, the display 110 may be rotated by a motor or may be rotated using a link mechanism or the like. Here, an angle formed by the reference plane P and a principal plane (screen 112) of the display 110 is denoted by ΔDisplay.

The table 140 is disposed on, for example, the top of the desk-type housing. The table 140 is a transparent plate-like member made of glass, plastic, or the like, and is fixed such that a principal plane of the table is located at approximately 90 degrees with respect to the reference plane P.

The beam-splitter 120 is disposed below the table 140. The beam-splitter 120 is a translucent optical member that separates incident light into reflected light and transmitted light, and reflects a part of light emitted from the screen 112 of the display 110 toward the retro-reflective member. Note that the beam-splitter 120 may be a half mirror in which an amount of the reflected light is equal to an amount of the transmitted light.

The beam-splitter 120 is rotatable about an end of the beam-splitter as a fulcrum such that an inclination angle of a principal plane changes with respect to the reference plane P. A mechanism for changing an inclination angle of the beam-splitter 120 is not particularly limited, but for example, the beam-splitter 120 may be rotated by a motor or may be rotated using a link mechanism or the like. Here, an angle formed by the principal plane of the table 140 and the principal plane of the beam-splitter 120 is denoted by ΔBS.

The retro-reflective member 130 is disposed below the display 110. The retro-reflective member 130 is an optical member that reflects light in the same direction as the incident light, and the configuration thereof is not particularly limited but is configured by, for example, a prismatic retro-reflective element such as a triangular pyramid retro-reflective element or a full cube corner retro-reflective element, or a bead retro-reflective element. The retro-reflective member 130 is configured as, for example, a concave mirror, and reflects light incident from the beam-splitter 120 toward the beam-splitter 120.

The aerial image 150 is generated at a position symmetrical to the display 110 with respect to the principal plane of the beam-splitter 120. Here, an angle formed by a principal plane of the aerial image 150 and the reference plane P is denoted by ΔAerial, and an angle formed by the principal plane of the aerial image 150 and the principal plane of the display 110 is denoted by Δθ.

The aerial image 150 that can be observed by a user is limited to a range in which the retro-reflective member 130 can be viewed from the viewpoint U of the user via the beam-splitter 120. Further, the optimum angle or direction for the user to observe the aerial image 150 is a direction in which the aerial image 150 is viewed from directly above, that is, a direction perpendicular to the principal plane of the aerial image 150. When the display 110 enters the field of view viewed from this direction of the viewpoint, the image or picture of the display 110 enters the aerial image 150, and the floating feeling of the aerial image 150 is lost.

In the present embodiment, to prevent the display 110 from entering the field of view of the user, an angle Δθ formed by the aerial image 150 and the display 110 is set to 90 degrees or more.

The relationship at this time is shown in mathematical expression (1).

$$\Delta\theta=180-(\Delta\text{Aerial}+\Delta\text{Display})\geq 90° \quad (1)$$

When Δθ is 90 degrees or more, the user cannot view the image on the screen 112 of the display 110.

ΔDisplay is minimized to satisfy the mathematical expression (1). Since the purpose is to expand a movable range of ΔAerial, it is effective to move the beam-splitter 120. The relationship among ΔAerial, ΔBS, and ΔDisplay when the beam-splitter 120 is moved is shown in mathematical expression (2).

$$\Delta\text{Aerial}=\Delta\text{BS}\times 2+\Delta\text{Display} \quad (2)$$

As shown in the mathematical expression (2), movement of the beam-splitter 120 can make the movement of the aerial image 150 larger than the movement of the display 110 does, and the movement of the ΔDisplay can be suppressed by ΔBS×2. By moving the beam-splitter 120, it is possible to expand the movable range of the aerial image 150 and implement the mathematical expression (1), while minimizing the movement of the display 110. Suppressing the movement of the display 110 also leads to space saving inside the housing.

Figure 3A:
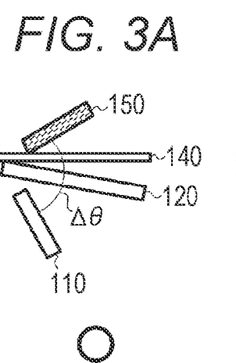
FIGS. 3A to 3D are views for describing movement of an aerial image when a beam-splitter and a display of the display device according to this embodiment of the present disclosure are moved.
Figure 3B:
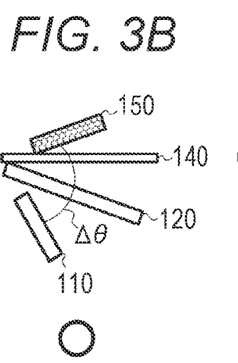
Figure 3C:
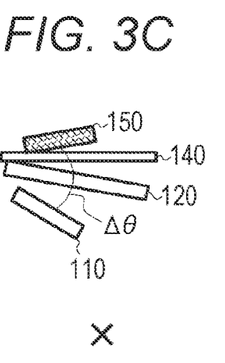
Figure 3D:
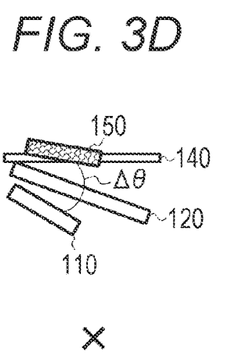

FIGS. 3A to 3D illustrate movable ranges of the aerial image 150 when the display 110 and the beam-splitter 120 are moved. FIGS. 3A and 3B illustrate the aerial image 150 when the beam-splitter 120 is moved in a state where an inclination angle of the display is made relatively small. In this case, Δθ is 90 degrees or more, and the aerial image 150 is appropriately moved. FIGS. 3C and 3D illustrate the aerial image 150 when the beam-splitter 120 is moved in a state where the inclination angle of the display is made larger than that in FIGS. 3A and 3B. The aerial image 150 is considerably inclined toward the table 140, and Δθ is less than 90 degrees. In this case, the aerial image 150 is excessively moved.

Figure 4A:
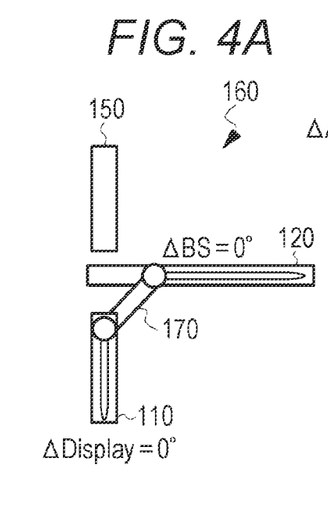
FIGS. 4A to 4E are views and a table illustrating a configuration example of an angle adjustment mechanism that connects and moves the beam-splitter and the display of the display device according to this embodiment of the present disclosure.
Figure 4B:
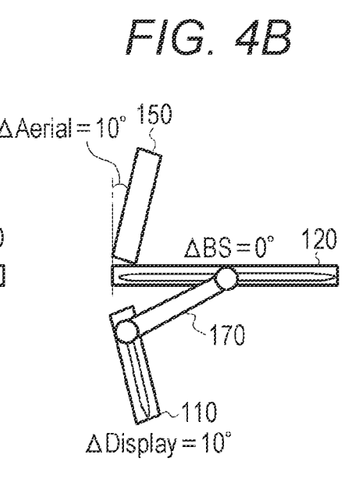
Figure 4C:
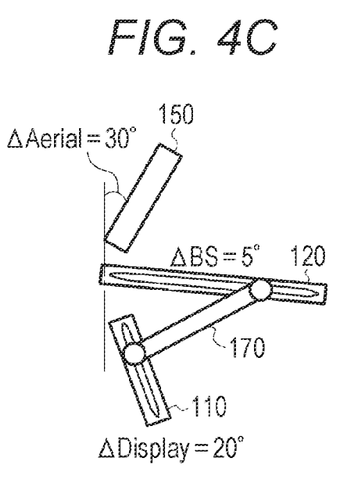

FIG. 4A illustrates an example of an angle adjustment mechanism of the present embodiment. An angle adjustment mechanism 160 includes an extensible link 170 that connects the display 110 and the beam-splitter 120. One end of the link 170 is rotatably and slidably connected in a groove formed along a side of the display 110, and the other end is rotatably and slidably connected in a groove formed along a side of the beam-splitter 120. The angle adjustment mechanism 200 rotates both the display 110 and the beam-splitter 120 in conjunction with each other so as to satisfy the relationship shown in the mathematical expression (2), adjusts ΔBS and ΔDisplay, and moves the aerial image 150.

Figure 4D:
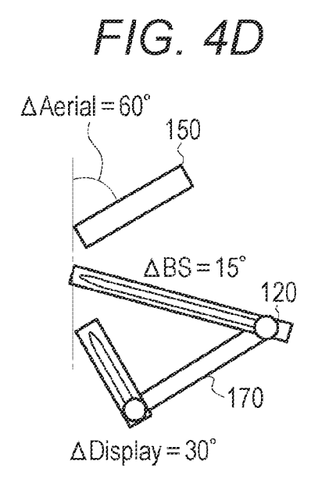
Figure 4E:
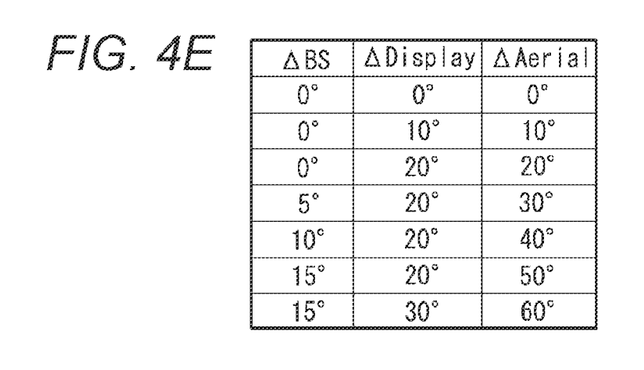

As an example, a movable range (ΔAerial) of the aerial image 150 is assumed to be 0° to 60° as illustrated in the table of FIG. 4E. This table illustrates the relationship between the inclination angle (ΔBS) of the beam-splitter 120 and the inclination angle (ΔDisplay) of the display 110 when ΔAerial is set according to the mathematical expression (2). Further, FIGS. 4A to 4D illustrate examples in which ΔAerial=0°, ΔAerial=10°, ΔAerial=30°, and ΔAerial=60° are set according to ΔBS and ΔDisplay defined in the table. For example, when ΔAerial is set to 60°, ΔBS=15° and ΔDisplay=30° are adjusted.

In these examples, when ΔAerial=60° illustrated in FIG. 4D, the condition of Δθ≥90° defined in the mathematical expression (1) is satisfied. That is, $$\Delta\theta = 180 - (60° + 30°) = 90° \quad (1)$$

The inclination angles of ΔBS and ΔDisplay defined in the table of FIG. 4E are merely examples, and other inclination angles may be used. For example, when ΔAerial is set to 30°, ΔBS=10° and ΔDisplay=10° may be set according to the mathematical expression (2), and when ΔAerial is set to 50°, ΔBS=20° and ΔDisplay=10° may be set. Further, in the above embodiment, an example in which the angle adjustment mechanism 160 interlocks the beam-splitter 120 and the display 110 has been described, but this is only an example, and the angle adjustment mechanism 160 may separately rotate or move the beam-splitter 120 and the display 110 by independent mechanisms.

Figure 5:
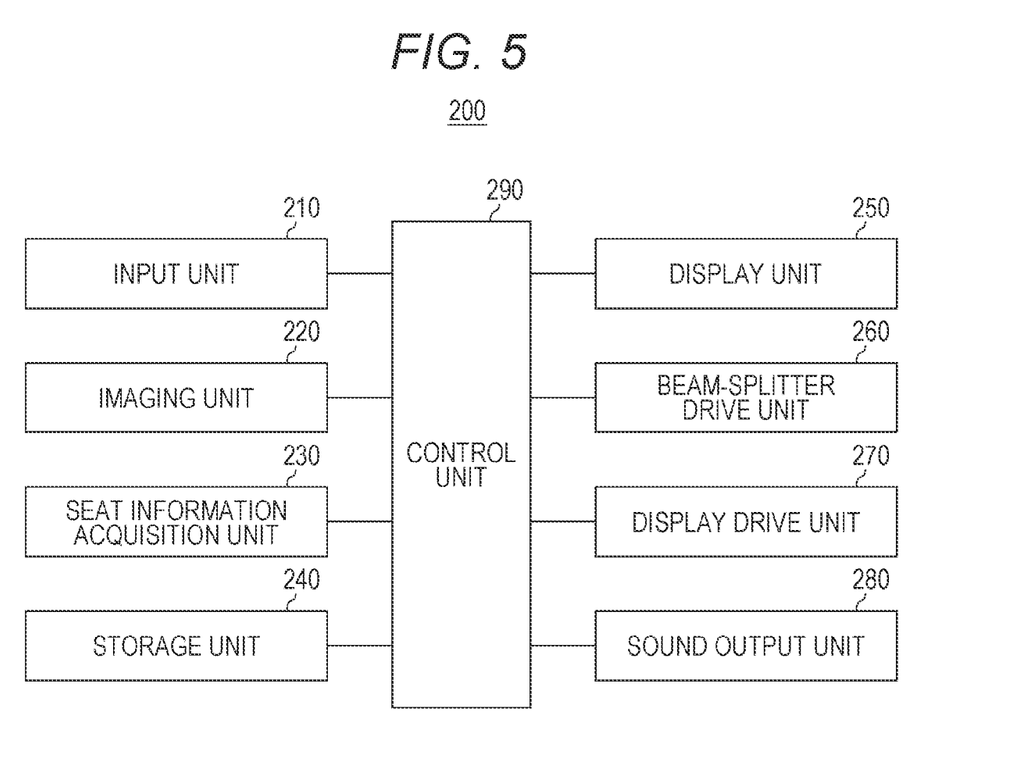
FIG. 5 is a block diagram of a configuration example of an in-vehicle display device according to another embodiment of the present disclosure.

Next, another embodiment of the present embodiment will be described. FIG. 5 is a block diagram illustrating a configuration of a display device of the present embodiment. A display device 200 includes an input unit 210 that receives an input from the user, an imaging unit 220, a seat information acquisition unit 230, a storage unit 240, a display unit 250, a beam-splitter drive unit 260, a display drive unit 270, a sound output unit 280, and a control unit 290. In some implementations, any one or more of the functional blocks 210, 220, 230, 240, 250, 260, 270, 280, and/or 290 described above can be implemented, in whole or in part, by any of hardware, a digital signal processor (DSP), and/or software. For example, in a case where a functional block is configured by software, each such functional block may include, for example, a CPU, a RAM, and a ROM of a computer, and is achieved by operation of a program stored in a recording medium, such as a RAM, a ROM, a hard disk, or a semiconductor memory.

The display device 200 of the present embodiment is mounted in a vehicle, for example. The imaging unit 220 captures a space inside the vehicle and provides captured image data to the control unit 290. The seat information acquisition unit 230 acquires information regarding the vehicle. Seat information includes, for example, a seat position of a seat, an inclination angle of a backrest, and the like. The storage unit 240 stores various data, application software, and the like necessary for the display device 200.

For example, image data to be displayed on the display 110, sound data output from the sound output unit 280, and the like are stored.

The display unit 250 includes the display 110, the beam-splitter 120, the retro-reflective member 130, the table 140, and the like as illustrated in FIG. 2. The beam-splitter drive unit 260 varies the inclination angle of the beam-splitter 120. For example, the beam-splitter drive unit 260 drives a motor connected to the beam-splitter 120 to vary the inclination angle of the beam-splitter 120. The display drive unit 270 varies the inclination angle of the display 110. For example, the display drive unit 270 drives a motor connected to the display to vary the inclination angle of the display. The sound output unit 280 outputs, for example, sound corresponding to an image displayed by the display unit 250. The control unit 290 controls the image displayed by the display unit 250 and controls the beam-splitter drive unit 260 and the display drive unit 270.

In a certain mode, the control unit 290 estimates an optimum angle of the aerial image when observed from the viewpoint of the user, and controls the beam-splitter drive unit 260 and the display drive unit 270 on the basis of the estimated optimum angle to implement Δθ≥90°.

To estimate the optimum angle of the aerial image, the control unit 290 analyzes the image data captured by the imaging unit 220 and calculates the viewpoint (three-dimensional coordinate position) of the user. The viewpoint (eye point) is a center position of left and right eyes. Further, an initially set mounting position (height, angle (ΔDisplay), and the like) of the display 110 and a mounting position of the beam-splitter 120 are known. In view of the configuration that the aerial image 150 is generated at the position symmetrical with respect to the principal plane of the beam-splitter, the control unit 290 estimates the optimum angle (ΔAerial) of the aerial image 150 for viewing the aerial image 150 in a vertical direction from the calculated viewpoint. Then, the angles at which the beam-splitter 120 and the display 110 are rotated are calculated on the basis of the estimated optimum angle so as to satisfy the mathematical expressions (1) and (2), and the beam-splitter drive unit 260 and the display drive unit 270 are controlled and moved according to the calculated angles.

For example, when 40° is estimated as the optimum angle (ΔAerial) of the aerial image, the control unit 290 calculates ΔBS=10° and ΔDisplay=20° from the mathematical expression (2) or the table of FIG. 4E, and controls the driving of the beam-splitter drive unit 260 and the display drive unit 270 on the basis of the calculated values.

Further, as another method of calculating the viewpoint of the user, the control unit 290 may calculate the viewpoint of the user using the seat information acquired from the seat information acquisition unit 230 and standard body information (for example, a sitting height, a height of the head when the user sits on a seat, and the like) prepared in advance and stored in the storage unit 240.

As described above, according to the present embodiment, the viewpoint of the user is calculated, the optimum angle (ΔAerial) of the aerial image is estimated from the calculated viewpoint, and the angles at which the beam-splitter 120 and the display 110 are rotated are calculated on the basis of the estimated optimum angle, whereby the user can automatically adjust ΔBS and ΔDisplay without any operation. As a result, the user can observe the aerial image having a floating feeling.

In the above embodiment, ΔBS and ΔDisplay are automatically adjusted. However, the present embodiment is not limited thereto, and for example, the user may input an instruction for adjusting ΔBS or the ΔDisplay from the input unit 210.

In the above embodiment, an example in which the aerial image 150 is generated using the beam-splitter 120 and the retro-reflective member 130 has been described. However, a polarization beam-splitter may be used instead of the beam-splitter 120, and a λ/4 plate may be arranged on the upper surface side of the retro-reflective member 130. The polarization beam-splitter reflects light from the display 110, and the λ/4 plate allows the light reflected by the polarization beam-splitter to enter the plate and transmits the incident light with a phase difference π/2 (90 degrees). The retro-reflective member 130 reflects the light transmitted through the λ/4 plate in the same direction as the incident light. When the light reflected by the retro-reflective member 130 is transmitted through the λ/4 plate again, the phase difference π/2 is provided. Thus, the light transmitted through the λ/4 plate has a phase difference π from the light incident on the λ/4 plate. For example, in a case where the light incident on the λ/4 plate is linearly polarized light, the light becomes circularly polarized light (or elliptically polarized light) when passing through the λ/4 plate, when the circularly polarized light is retro-reflected an odd number of times by the retro-reflective member 130, the circularly polarized light becomes circularly polarized light in an opposite direction, and when this circularly polarized light in the opposite direction passes through the λ/4 plate, the circularly polarized light becomes linearly polarized light in a direction 180 degrees different from the original linearly polarized light. In this way, when the light transmitted through the λ/4 plate is incident on the polarization beam-splitter, most of the light is transmitted through the polarization beam-splitter, the transmitted light forms an image, and the aerial image is formed.

Figure 6:
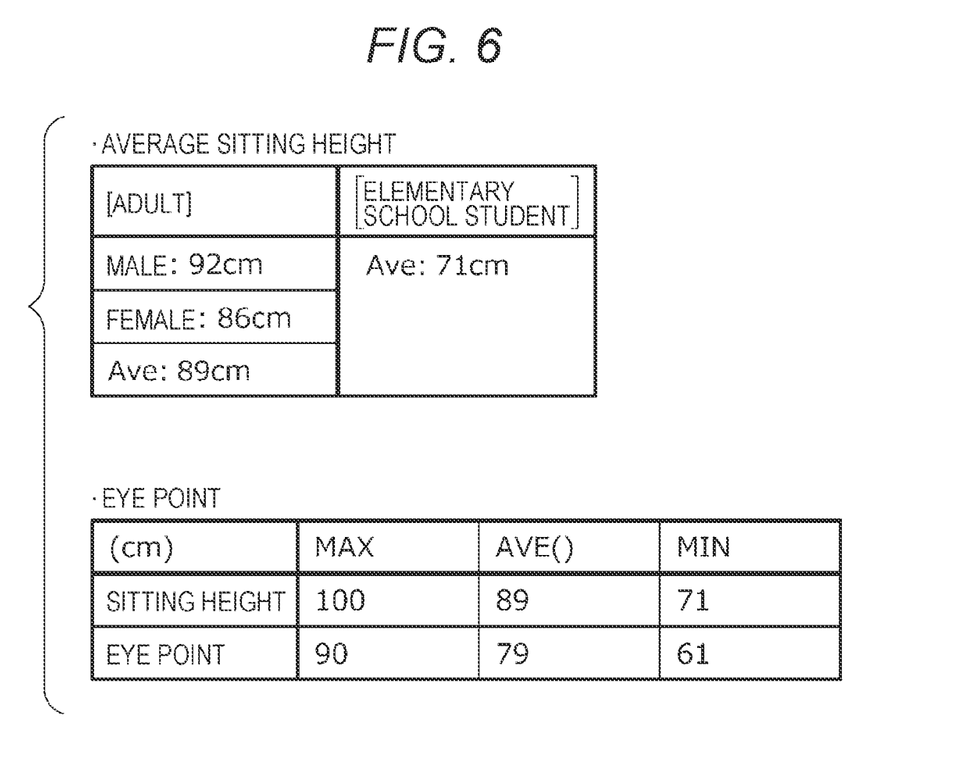
FIG. 6 is tables for describing a demonstration example of the display device according to an embodiment of the present disclosure.

Next, a specific demonstration example in the display device of the present embodiment will be described. A target height of an observer is 130 cm to 190 cm. 130 cm is an average height of elementary school students, and 190 cm covers the heights of most adults. FIG. 6 illustrates an average sitting height of the adult and the elementary school student. Further, the eye point (viewpoint) is denoted by the eye point=the sitting height−10 cm. FIG. 6 illustrates eye points of the adult and the elementary school student.

Next, a method of calculating optimum values of a desk and a chair based on ergonomics is described as follows.

The height of a seat surface of the chair=the height×0.25−1

The height of the desk=(the height×0.25−1)+(the height×0.183−1)

For example, the average height of Japanese adults is about 165 cm. In this case, the seat height of the chair is 39 cm, and the height of the desk is 68 cm.

Figure 7:
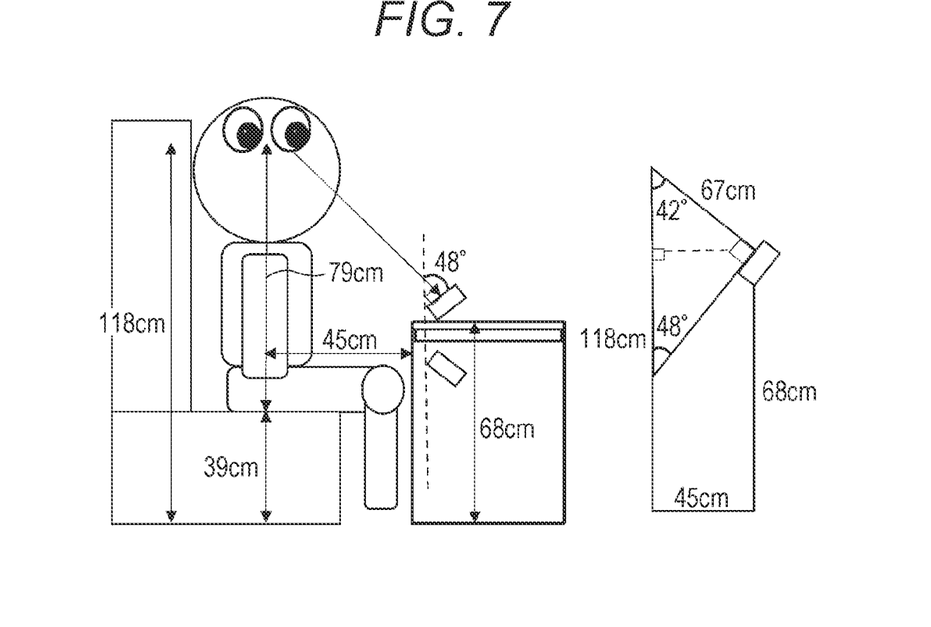
FIG. 7 is a diagram for describing a demonstration example of the display device according to an embodiment of the present disclosure.

FIG. 7 is a diagram illustrating a calculation example of the optimum angle (ΔAerial) of the aerial image from the eye point. The optimum angle of the aerial image is calculated by the following equation, where the sitting height of the average adult is 89 cm, the seat height of the chair is 39 cm, the height of the eye point from a ground contact surface of the chair is 118 cm, the height of the desk is 68 cm, and a minimum required distance between the desk and the observer is 45 cm, as illustrated in the drawing.

ΔAerial=cos(the eye point−a horizontal distance of the aerial image/the eye point−an actual distance of the aerial image)

According to this mathematical expression, ΔAerial is 48 degrees when the height of the eye point is 118 cm.

Incidentally, ΔAerial is 53 degrees in the case where the height of the eye point is 130 cm that is the maximum value, and ΔAerial is 35 degrees in the case where the height of the eye point is 100 cm that is the minimum value.

In the case where the optimum angle of the aerial image is ΔAerial=48°, Δθ=180°−(48°+48°)=84° in the mathematical expression (1), and Δθ<90° is obtained. Here, the beam-splitter 120 is horizontal (ΔBS=0°) and the ΔDisplay of the display 110, which is symmetrical with respect to the principal plane of the beam-splitter 120, is 48°. In this state, the picture of the display 110 enters the field of view of the user.

Therefore, in the present embodiment, the table of FIG. 4E is referred to and ΔAerial=50 closest to the optimum angle is referred to, and the angle of the beam-splitter 120 is adjusted to ΔBS=15° and the angle of the display 110 is adjusted to ΔDisplay=20°. As a result, Δθ 180°−(20°+48°) ≈112° of the mathematical expression (1) is obtained, and Δθ>90° can be obtained.

Figure 8:
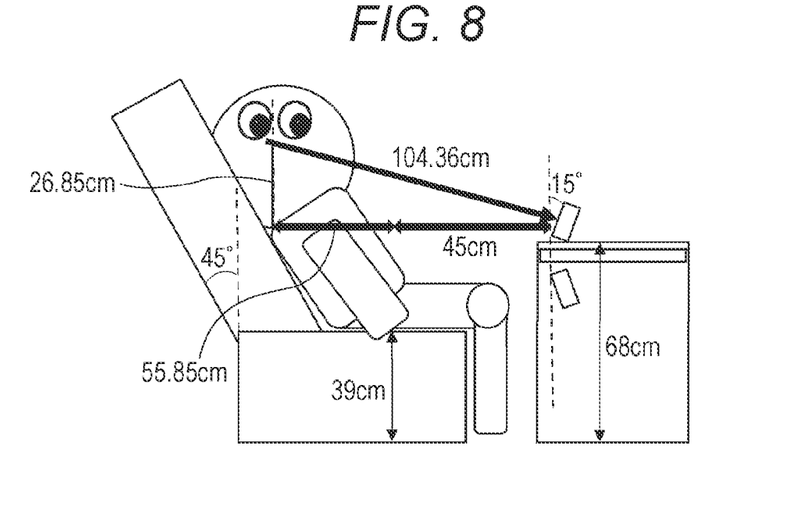
FIG. 8 is a diagram for describing a demonstration example of the display device according to an embodiment of the present disclosure.

FIG. 8 is a diagram illustrating a calculation example of the optimum angle (ΔAerial) of the aerial image when the backrest of the seat is inclined. As illustrated in the drawing, the optimum angle of the aerial image is calculated by the following equation, where the sitting height of the average adult is 89 cm, the seat height of the chair is 39 cm, the inclination angle of the backrest is 45°, the desk height is 68 cm, and the minimum required distance between the desk and the observer is 45 cm.

ΔAerial=cos(100.85/104.36)=15°

Figure 9:
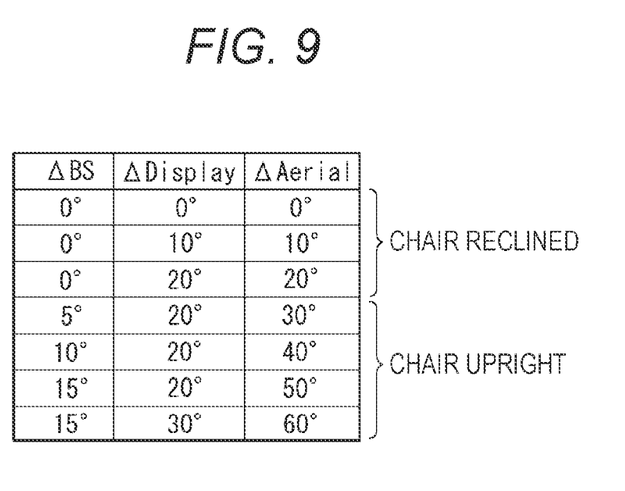
FIG. 9 is a diagram for describing a demonstration example of the display device according to an embodiment of the present disclosure.

In the case where the backrest is inclined, the optimum angle of the aerial image becomes small, and thus, as the movable range of the aerial image, a range from 0° to 20° is required as illustrated in FIG. 9. In this case, the picture of the display 110 does not enter the field of view of the user even if the beam-splitter 120 is not moved.

As described above, according to the display device of the present embodiment, by moving the beam-splitter 120 having high angle dependency of ΔAerial, the movable range of the aerial image can be expanded as compared with a case where only the display is movable. Further, space saving of the housing can be expected by minimizing the movement of the display. Further, for children to adults with different eye points, or users with different physical characteristics, it is possible to observe the aerial image with a floating feeling where the picture of the display does not enter.

Although there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments disclosed, but that the disclosure will include all embodiments falling within the scope of the appended claims.

What is claimed is:

1. A display device capable of displaying an aerial image using retro-reflection, the display device comprising:
   a display capable of displaying an image;
   a beam-splitter configured to reflect light emitted from the display;

a retro-reflective member configured to reflect the light from the beam-splitter in a same direction as incident light;
a first variable unit configured to vary an inclination angle of the display; and
a second variable unit configured to vary an inclination angle of the beam-splitter;
wherein the first variable unit includes a mechanism that interlocks with the second variable unit.

2. The display device according to claim 1, wherein the first variable unit and the second variable unit satisfy $$\Delta\Theta=180-(\Delta\text{Aerial}+\Delta\text{Display})\geq 90 \text{ degrees}$$

where the inclination angle of the display is denoted by ΔDisplay, an inclination angle of the aerial image generated at a position symmetric to the display with respect to the beam-splitter is denoted by ΔAerial, and an angle formed by the aerial image and the display is denoted by Δθ.

3. The display device according to claim 2, wherein the first variable unit and the second variable unit satisfy $$\Delta\text{Aerial}=\Delta\text{BS}\times 2+\Delta\text{Display}$$

where the inclination angle of the beam-splitter is denoted by ΔBS.

4. The display device according to claim 3, further comprising:
a control unit configured to control the first variable unit and the second variable unit such that the image of the display does not enter a field of view of a user when the aerial image is observed from a vertical direction.

5. The display device according to claim 4, wherein the control unit calculates a viewpoint of the user, estimates an optimum angle when observing the aerial image on a basis of the calculated viewpoint, and controls the first variable unit and the second variable unit on a basis of the estimated optimum angle.

6. The display device according to claim 2, further comprising:
a control unit configured to control the first variable unit and the second variable unit such that the image of the display does not enter a field of view of a user when the aerial image is observed from a vertical direction.

7. The display device according to claim 6, wherein the control unit calculates a viewpoint of the user, estimates an optimum angle when observing the aerial image on a basis of the calculated viewpoint, and controls the first variable unit and the second variable unit on a basis of the estimated optimum angle.

8. The display device according to claim 1, further comprising:
a control unit configured to control the first variable unit and the second variable unit such that the image of the display does not enter a field of view of a user when the aerial image is observed from a vertical direction.

9. The display device according to claim 8, wherein the control unit calculates a viewpoint of the user, estimates an optimum angle when observing the aerial image on a basis of the calculated viewpoint, and controls the first variable unit and the second variable unit on a basis of the estimated optimum angle.

10. A display device capable of displaying an aerial image using retro-reflection, the display device comprising:
a display capable of displaying an image;
a beam-splitter configured to reflect light emitted from the display;
a retro-reflective member configured to reflect the light from the beam-splitter in a same direction as incident light;
a first variable unit configured to vary an inclination angle of the display; and
a second variable unit configured to vary an inclination angle of the beam-splitter;
wherein the first variable unit and the second variable unit satisfy $$\Delta\theta=180-(\Delta\text{Aerial}+\Delta\text{Display})\geq 90 \text{ degrees}$$

where the inclination angle of the display is denoted by ΔDisplay, an inclination angle of the aerial image generated at a position symmetric to the display with respect to the beam-splitter is denoted by ΔAerial, and an angle formed by the aerial image and the display is denoted by Δθ; and,
a control unit configured to control the first variable unit and the second variable unit such that the image of the display does not enter a field of view of a user when the aerial image is observed from a vertical direction.

11. The display device according to claim 10, wherein the control unit calculates a viewpoint of the user, estimates an optimum angle when observing the aerial image on a basis of the calculated viewpoint, and controls the first variable unit and the second variable unit on a basis of the estimated optimum angle.

12. The display device according to claim 11, wherein the first variable unit and the second variable unit further satisfy $$\Delta\text{Aerial}=\Delta\text{BS}\times 2+\Delta\text{Display}$$

where the inclination angle of the beam-splitter is denoted by ΔBS.

13. The display device according to claim 11, wherein the first variable unit includes a mechanism that interlocks with the second variable unit.

14. A display device capable of displaying an aerial image using retro-reflection, the display device comprising:
a display capable of displaying an image;
a beam-splitter configured to reflect light emitted from the display;
a retro-reflective member configured to reflect the light from the beam-splitter in a same direction as incident light;
a first variable unit configured to vary an inclination angle of the display formed by a reference plane of a housing and a principal plane of the display; and
a second variable unit configured to vary an inclination angle of the beam-splitter with respect to the reference plane;
a control unit configured to calculate a viewpoint of the user, estimate an optimum angle of the aerial image when observing the aerial image on a basis of the calculated viewpoint from a direction perpendicular to a principal plane of the aerial image, wherein ΔAerial is an inclination angle of the aerial image generated at a position symmetric to the display with respect to the beam-splitter formed by the principal plane of the aerial image and the reference plane, and to controls the first variable unit and the second variable unit on a basis of the estimated optimum angle ΔAerial to satisfy Δθ=180−(ΔAerial+ΔDisplay)≥90 degrees, where the inclination angle of the display is denoted by ΔDisplay, and an angle formed by the aerial image and the display is denoted by Δθ.

15. The display device according to claim 14, wherein
The control unit is configured to control the first variable unit and the second variable unit to also satisfy $$\Delta Aerial = \Delta BS \times 2 + \Delta Display$$

where the inclination angle of the beam-splitter is denoted by $\Delta BS$ and is formed by a principal plane of a table or plate-like member and a principal plane of the beam-splitter.

16. The display device according to claim 14, wherein the first variable unit includes a mechanism that interlocks with the second variable unit.

\* \* \* \* \*